(12) United States Patent
McAuliffe et al.

(10) Patent No.: US 6,212,541 B1
(45) Date of Patent: *Apr. 3, 2001

(54) SYSTEM AND METHOD FOR SWITCHING BETWEEN SOFTWARE APPLICATIONS IN MULTI-WINDOW OPERATING SYSTEM

(75) Inventors: Garrett McAuliffe, Kirkland; Leonard Zuvela, Mikilteo, both of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/328,353

(22) Filed: Oct. 24, 1994

(51) Int. Cl.[7] ............................................. G06F 9/00
(52) U.S. Cl. ............................................. 709/100; 709/107
(58) Field of Search .................................. 395/157, 161; 709/100, 102, 104, 107

(56) References Cited

U.S. PATENT DOCUMENTS 5,442,376 * 8/1995 Tannenbaum et al. ............... 345/146
5,499,334 * 3/1996 Staab ..................................... 395/157

OTHER PUBLICATIONS

Manual–User's Guide, Microsoft Corporation, "Microsoft Windows Graphical Environment User's Guide" (Ver. 3.0), p. 32 (1990).

Manual–User's Guide, Microsoft Corporation, "Microsoft Windows for Workgroups & MS–DOS 6.2" (Ver. 3.1), pp. 61, 85–86 (1993).

* cited by examiner

Primary Examiner—Majid Banankhah
(74) Attorney, Agent, or Firm—Joseph R. Kelly; Westman, Champlin & Kelly, P.A.

(57) ABSTRACT

A computer implemented method and system for switching from one application to a second application. A user enters a "switch to" command, either directly or imbedded within a macro. A determination is then made whether the application to be switched to is running. If the application is running, the focus of the operating system is switched to the second application. If the second application is not running, then the application is launched. When determining whether the application is running, determinations are made regarding whether the application is invisible or owned.

17 Claims, 3 Drawing Sheets

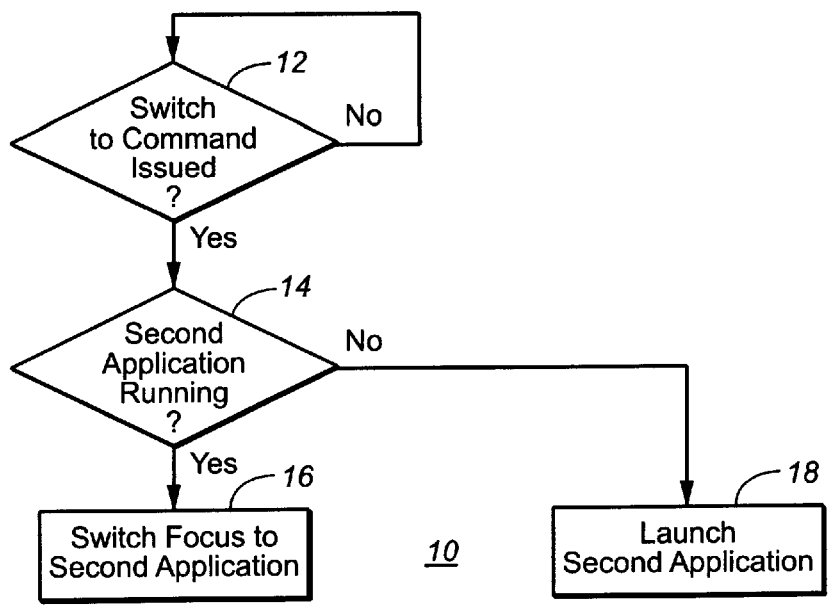
FIG._1
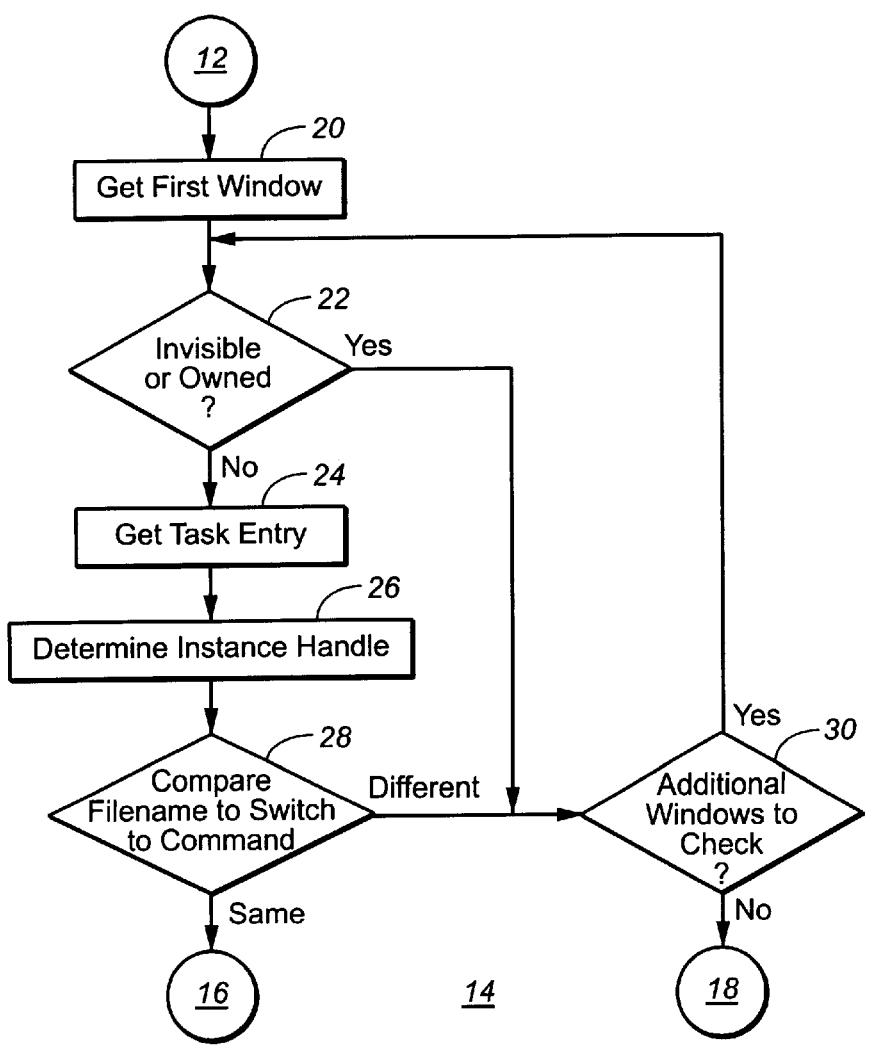
FIG._2

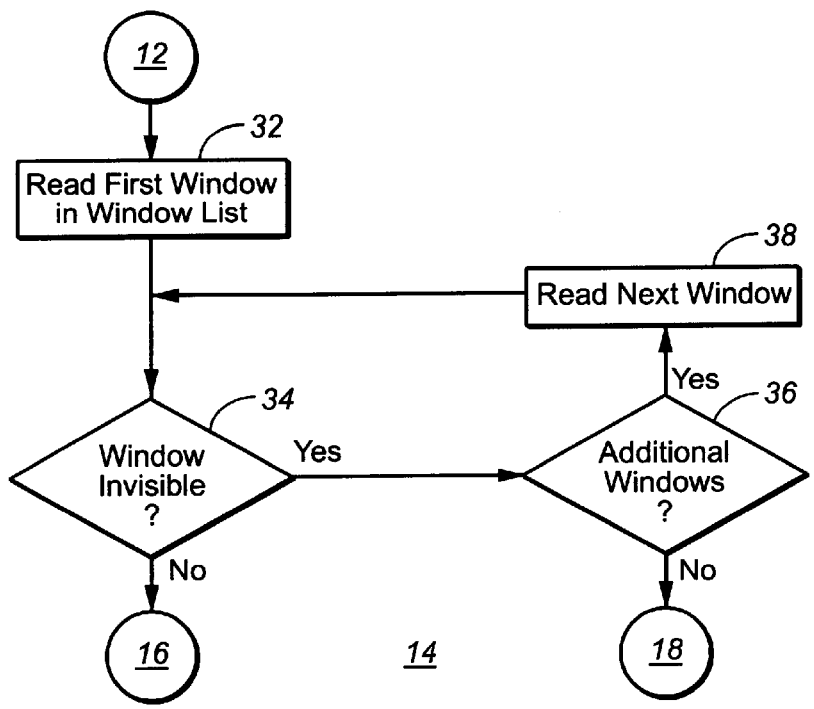
FIG._3
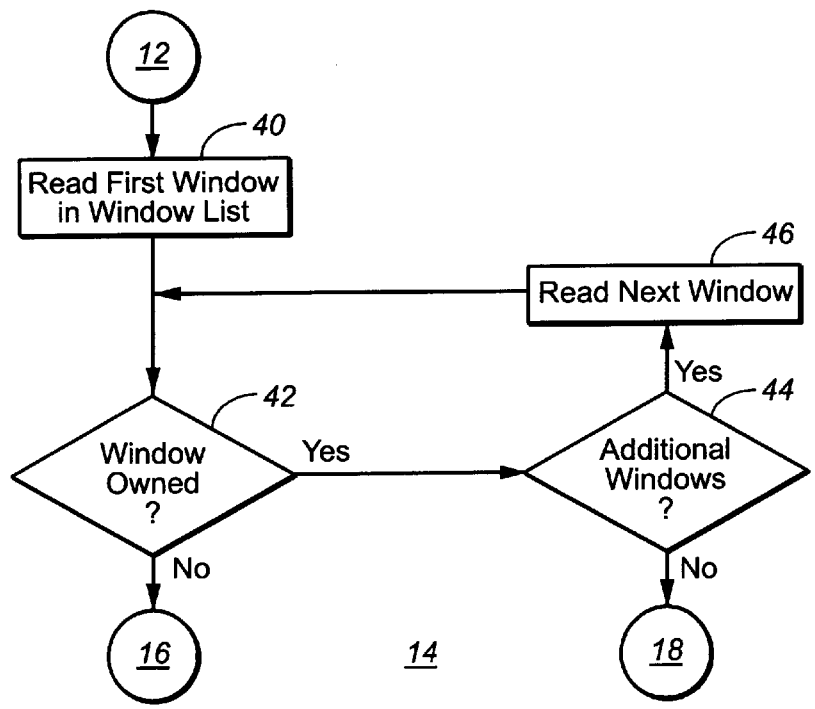
FIG._4

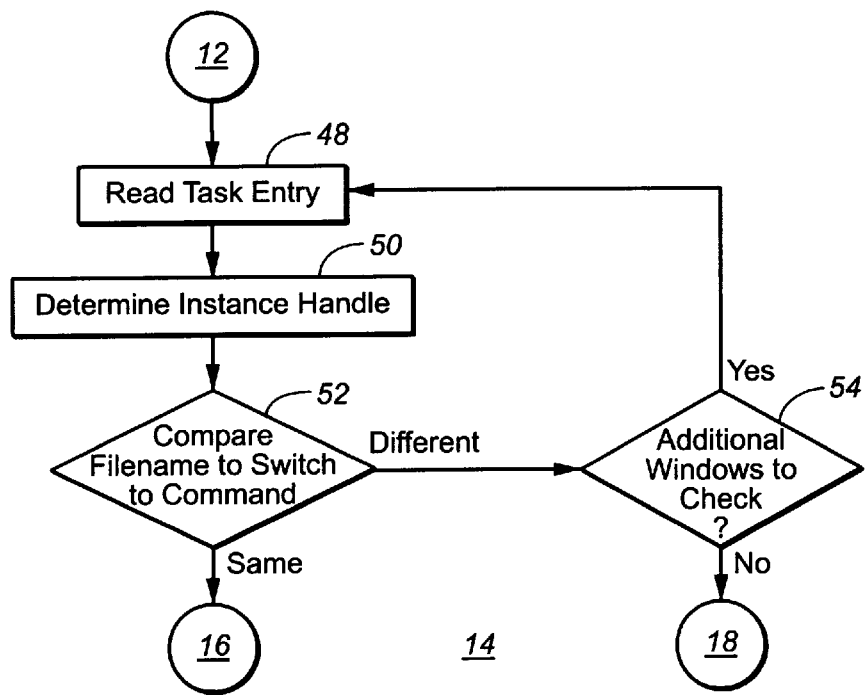
FIG._5
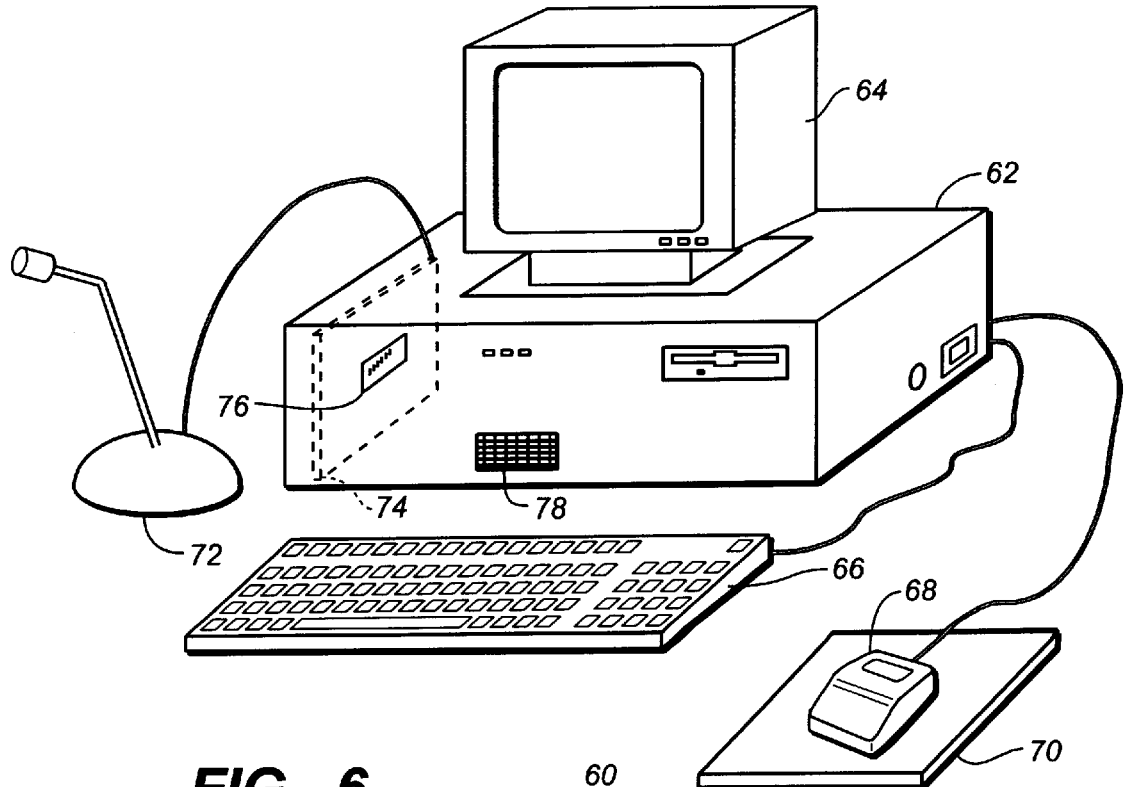
FIG._6

SYSTEM AND METHOD FOR SWITCHING BETWEEN SOFTWARE APPLICATIONS IN MULTI-WINDOW OPERATING SYSTEM

FIELD OF THE INVENTION

The present invention relates to a method and system for switching between software applications in a multi-window operating system and, more particularly, in a Windows™ based system for switching to a software application using a voice command or a command imbedded within a macro.

BACKGROUND OF THE INVENTION

One widely sold operating system program which helps control a computer is WINDOWS™ version 3.1 ("WINDOWS") of Microsoft Corporation. Among other features, WINDOWS provides a graphical user interface allowing the user the option of using a pointing device such as a mouse, to control the operation of the computer without the need to memorize text commands usually required in DOS based applications. WINDOWS also provides application programmers with tools so that applications have a common look in structure as well as execution of common operations. A WINDOWS application programmer is thus provided with a variety of tools to assist in controlling various computer functions as well as designing "user friendly" applications.

A software program written for WINDOWS operation uses dynamic link libraries (DLLs) which contain a plurality of application programming interfaces (APIs). Examples of such DLLs are USER.EXE, KRNL386.EXE, and GDI.EXE which contain the core functionality APIs that make up Microsoft Windows 3.1. Although each of these three DLLs has the .EXE extension (usually representing an executable application), each is a DLL. The APIs are used to carry out various WINDOWS functions. For example, if a software program requires a dialog box displayed on a computer monitor to prompt a user for a command or data entry, the software program would make a call to the DialogBox API which brings up a dialog box on the computer monitor. The contents of the dialog box are local to or associated with the particular application which made the call. Another example of a WINDOWS API is the SetWindowLong API. This API associates data with a particular window, allowing a user who has switched applications to return to the point in the original application where processing had been taking place prior to the switch to the other application. WINDOWS operation and WINDOWS programming, including the use of DLLs and APIs are well known by those skilled in the art. The Microsoft WINDOWS Software Development Kit, Guide to Programming, Volumes 1–3, 1992, is incorporated by reference herein. It is available and used by WINDOWS programmers and provides reference information for many of the DLLs and APIs which are available to WINDOWS programmers.

WINDOWS, while providing ease of use for running applications, may serve as a platform for a voice recognition system. One of the features of operating systems such as WINDOWS is the ability to launch more than one application so that more than one application is running at the same time.

In WINDOWS, when more than one application is running at the same, only one of the applications is considered to be in focus by the WINDOWS operating system. The application which is in focus is usually highlighted in some way, such as by having the title displayed in a background color if minimized as an icon or changing the color of the title bar if the application is running full size. User input of data or commands from an input device such as a keyboard, mouse, or microphone, typically go directly to the application which is in focus. The window which is in focus can be in one of three states: "maximized" (taking up the full window screen); "normal" or "restored" (taking up a part of the window screen); or "minimized" (where the application is represented by an icon located at the bottom of the screen). Applications which are not in focus can also appear in any of these three states. If the application in focus is maximized, no other application is visible on screen until that application is brought into focus, unless another application has the "always on top" window style.

In order to bring an application into focus, a user typically uses a pointing device, such as a mouse, or the keyboard. Before an application can be brought into focus, however, it must be determined whether or not the application is already running. A user accomplishes this visually, by looking at a computer monitor (such as monitor 64 shown in FIG. 6). This requires the user to display the WINDOWS screens and/or WINDOWS icons in a manner which allows the user to determine if an application is already running. For example, such a display may take the form of the open and in focus Program Manager™ displayed over part of the screen with the lower part of the computer monitor showing icons of applications which have been launched and running, which are not in focus. Focus can be switched from Program Manager (a first application) to a second application by selecting a second application (such as an iconized application).

Another example of establishing which applications are running involves using Task List™ (task manager) by pressing the control [CTRL] and escape [ESC] keys of the keyboard simultaneously. This displays the WINDOWS Task List. The Task List shows which WINDOWS applications are currently running (including the program manager).

Using the Task List, a user is given several options ("buttons") regarding the applications displayed in the Task List. One of the buttons is the "switch to" button. The "switch to" button in the Task List allows switching between application windows and icons which have already been launched and are running. There is no provision for determining whether an application is currently running or switching to an application which is not running. The switch to button also requires that a designated application appearing in the Task List is highlighted prior to "pressing" or selecting the switch to button.

Other ways of viewing and selecting applications which are already running will be understood by those skilled in the art and is explained in texts such as the Microsoft WINDOWS User's Guide Version 3.1 of the Microsoft Corporation.

With the advent of voice recognition systems, such as the Voice Pilot Version 2.0 included with the Microsoft WINDOWS Sound System Version 2.0, both of Microsoft Corporation, voice control of various functions has become an option for entering data and controlling a computer. Pointing devices (including touch screens) and keyboards are thus not the only means for a user to interactively enter data and control the computer in real time.

SUMMARY OF THE INVENTION

The present invention involves a method and system for switching the focus of an operating system of a computer from a first application to a second application. The first step of the present computer implemented invention is to determine if a switch to command has been detected. Once the switch to command is detected, the next step is to determine if the second application (the application to be switched to) is presently running. If the second application is already running, the focus of the operating system is switched to the second application. If it is determined that second application is not running, the operating system launches the second application making it the focused application.

In a preferred embodiment of the present invention, there are two conditions which are checked in addition to whether the second application is presently running. One of these checks involves determining whether a second application is an invisible window before switching to the second application. This is determined by first reading the list of windows, maintained by WINDOWS, to determine which applications are already running. Next, it is determined whether or not the window read from the list is invisible. If the window is invisible, the window list is checked for an additional window. If there is an additional window, the next window is read and processing is repeated to determine if the next window is invisible. If the window is not invisible, focus is switched to that window (application). If after detecting an invisible window, there is not an additional window, then the second application is not currently running and the second application is launched.

Another test in a preferred embodiment is to determine whether or not a window is owned by another window. For this method, the window list is read and a determination is made as to whether or not a window is owned. If the window is owned by another window, it is determined whether or not an additional window is present. If an additional window is present, the next window is read to determine if the next window is owned. This process is repeated until a window not owned, at which time the focus is switched to that window. If there are no additional windows the operating system launches the second application.

Another test in a preferred embodiment, is determining whether an application is running, by reading the task entry of a window in the windows list and determining the instance handle for the task entry. The file name derived from the instance handle is then compared against the file name of the second application. If the file name is the same as the second application, then the focus of the operating system is switched to the second application. If the file name is different than the second application, a determination is made as to whether there are additional windows in the windows list to check. If there are additional windows to check, the process is repeated. If there are no additional windows to check, then the application is launched.

BRIEF DESCRIPTION OF THE FIGURES

The invention will now be described by way of non-limiting example, with reference to the attached drawings in which:

FIG. 1 is a flow diagram showing the method which operates in accordance with the present invention;

FIG. 2 is a flow diagram showing a preferred embodiment of the method shown in FIG. 1;

FIG. 3 is a flow diagram of a preferred embodiment of block 14 of FIG. 1;

FIG. 4 is a flow diagram of an additional embodiment of block 14 shown in FIG. 1;

FIG. 5 is a flow diagram of an additional embodiment of block 14 shown in FIG. 1;

FIG. 6 shows a personal computer and associated peripheral devices used in operating the system and performing the method in accordance with the present invention.

DETAILED DESCRIPTION OF THE INVENTION

There is shown in FIG. 6 an example computer system 60 for carrying out method 10 shown in the flow diagrams of FIGS. 1 through 5. Computer system 60 is comprised of a personal computer 62 having several peripheral devices, including monitor 64, keyboard 66, mouse 68 (resting on a mouse pad 70), microphone 72, sound card 74 (including a CODEC 76) plugged inside of computer 62 and a speaker 78. The present invention is not limited to the configuration for computer system 60 shown in FIG. 6. Other configurations which could operate the present method and system will be understood by those skilled in the art. Many personal computers, such as personal computer 62, use a microprocessor in the X86 line of processors, such as the 486 (80486) series of microprocessors. Other microprocessors could also be used in personal computer 62, as is understood by those skilled in the art.

Microphone 72 is as an input device for entering voice commands and data and converts acoustic energy into an analog electrical signal. Microphone 72 is shown connected to sound card 76. The combination of microphone 72 and sound card 76 can also be viewed as an input device. Other embodiments may carry out the functions of a microphone and sound card and thus also serve as an input device. Sound card 76 handles the interface between audio input and output (I/O) and computer 62. An example of a sound card 76 is the Microsoft WINDOWS Sound System model no. 206-151v200 which contains an Analog Devices AD1848 Parallel-SoundPort Stereo CODEC ("AD1848 CODEC"). The operation of the AD1848 CODEC is described in the Analog Devices specification REV 0 for the AD1848 CODEC, which is incorporated herein by reference. Other sound cards or devices which handle the interface between audio I/O and computer 62 can be used in the system of the present invention.

Monitor 64 displays the applications which are running including the application which the operating system of computer 62 is currently focused on.

Computer 62 includes an installed operating system. Examples of operating systems are MS-DOS 6.1 and Microsoft WINDOWS Version 3.1, both of Microsoft Corporation. In a preferred embodiment using WINDOWS Version 3.1, an additional operating system, such as MS-DOS 6.1 runs concurrently. Additionally, to provide voice recognition capability, a voice recognition application, such as Voice Pilot Version 2.0 ("Voice Pilot"), which is a part of the Microsoft WINDOWS Sound System Version 2.0 ("Sound System"), is installed on a storage device, such as a hard disk drive (not shown), on computer 62. The Software Specifications: Voice Pilot, Microsoft WINDOWS Sound System Version 1.1, VP-SPEC.DOC Revision 1.19 is incorporated herein by reference.

Windows applications, such as WINDOWS, Voice Pilot, and Microsoft Word For Windows Version 6.0 ("Word"), are designed to have a common access to various WINDOWS resources and utilize various WINDOWS commands. Examples of WINDOWS commands used by WINDOWS programmers are Dynamic Link Libraries (DLLs) and Application Programming Interfaces (APIs). An example of some APIs used by WINDOWS applications are the SetWindowPos() and the SendMessage() APIs. The SetWindowPos() API establishes the position of a window on screen and the SendMessage() API sends messages to applications, such as Voice Pilot when a word is spoken. Other APIs include the SetWindowsLong() API which associates data with a window which is used in regaining control of an application after switching between applications. Another API used by WINDOWS is the WaveInOpen API, which is a part of the MMSystem.DLL. It is used to access sound card 54 to input sound via microphone 52. The WaveInOpen API calls the Wave driver which in turn is used to "push" data into and out of sound card 54. Sound files used by WINDOWS are formatted in the .WAV file format. Other APIs are illustrated in the VLAYER.DLL specification revision 0.2 of the Microsoft Corporation as well as in the Microsoft WINDOWS Software Development Kit, Guide to Programming, Volumes 1–3, 1992, both of which are incorporated herein by reference.

There is shown in FIG. 1 a flow chart of a method 10 of the present invention which is carried out on computer system 60. In block 12, it is determined whether a switch to command has been issued. Two examples of switch to commands include a voice command and an imbedded macro command. In the example of a voice command, a user speaks into microphone 72 the words "switch to" followed by the name of the application or object to which the user desires the system to switch focus. The voice recognition system, such as Voice Pilot, loaded on computer 62, can be trained to associate any word or words with the function described in the present invention. Although the words "switch to" are used in the description of this invention, it will be understood by those skilled in the art that these words are a label placed upon the switch to function and not limited to the use of these exact words.

The second example of a switch to command is through an imbedded macro. A macro consists of a set of key strokes and commands. Macros are used in many applications, such as word processing and navigating WINDOWS. Macros are usually either programmed or recorded. If programmed, instructions are typed out as a mini-program. The mini-program is then saved and stored in a way that the macro is accessible by the software application for which the macro was written. If recorded, a macro recorder, such as the Microsoft WINDOWS RECORDER included with Microsoft WINDOWS Version 3.1, records a users keystrokes verbatim. The keystrokes are then saved in a similar fashion to the programmed macro.

Voice macros used in Voice Pilot can also imbed special commands. One of these special commands is the switch to command. An example of a macro including an imbedded switch to command is a macro named "Fred" which switches to Word for WINDOWS and types in the text "Dear Fred." The macro Fred could be launched through a voice command, such as by speaking the word, "Fred" into microphone 72. An alternative embodiment allows the macro "Fred" to be typed in association with the run command. In still another embodiment, a macro can be imbedded within a macro thereby having nested calls.

Once it is determined that a switch to command has been issued in block 12, processing continues to block 14 where it is determined whether or not the second application (the desired application to be switched to) is running. If it is determined that the second application is running, processing continues to block 16 where the focus of the operating system is switched from the currently focused application or window (the first application) to the second application, currently not in focus. If it is determined in block 14 that the second application is not running, processing continues to block 18 where the second application is launched. In the example previously given for the macro Fred, if WORD was already running, focus is switched to WORD and then the rest of the macro is executed by typing the text "Dear Fred" into a WORD document. If WORD was not operating, the operating system finds the location of the WORD application, launches the application, and then continues with the remainder of the macro by typing in the text "Dear Fred."

In a preferred embodiment, a program group in Program Manager is associated with a particular user containing applications which can be launched using the switch to command of Voice Pilot. For this example, a user trains the voice recognition system, such as Voice Pilot, to recognize the names given for each application (i.e. Word for WINDOWS) and associates a name with the application contained in the particular program group. An example of training Voice Pilot, as well as further examples using the switch to command and imbedded macros, are described in Microsoft WINDOWS Sound System Software User's Guide Version 2.0 and the Software Specifications: Voice Pilot, Microsoft Windows Sound System Version 1.1, Rev. 1.19 dated Jan. 27, 1994, of the Microsoft Corporation, both of which are hereby incorporated by reference.

There is shown in FIG. 2 a flow diagram showing an example of block 14 from FIG. 1, determining whether the second application is running. After determining that a switch to command is issued, processing continues to block 20 where the first window in the active window list kept by the WINDOWS operating system is obtained. The WINDOWS operating system keeps a list of all applications which are currently running, whether in minimized form or full screen form. After the first window is obtained, it is determined whether or not the window is invisible or owned.

If it is determined that the window is invisible or owned, processing continues to block 30 where it is determined if there are additional windows in the windows list. If there are additional windows, processing continues back to determination block 22 to determine whether or not the windows are invisible or owned. If it is determined that the windows are not invisible or owned, processing continues to block 24 where the task entry for the window is obtained. The task entry associates a window with a particular task, with each task being associated with a particular software application. Each application has one task entry. Processing continues to block 26 where the instance handle is determined from the task entry.

In a preferred embodiment, the instance handle is used to obtain the file name, as opposed to the full name of the application. An example of an application is WINWORD.EXE for the Word for WINDOWS executable file. The full name of WINWORD.EXE might be C:\WINWORD\WINWORD.EXE. This designates that the WINWORD executable file is located in the subdirectory "WINWORD" located off of the C drive root directory. The GetWindowTask() API (from User.DLL) is used to pass the task entry to the TaskFindHandle() API (from the ToolHelp.DLL Dynamic Link Library) to determine the windows instance handle. More than one instance handle can be associated with a given window. For example, if a DLL creates a window, the instance handle of the DLL and the instance handle of the application that loaded the DLL are both associated with the window. The instance handle is then passed to the GetModuleFileName() API (from User.DLL) to obtain the full filename (including path information). The filename without path information, is then broken out to the full filename for the comparison.

Problems could arise in those instances where applications have DLLs create windows for them. In such a case, if the GetWindowLong() API was used to obtain the instance handle of the window and then the GetModuleFilename() API was used to get the full filename, for example, the file name checked in the next step (shown in block 28) would be the file name of the DLL and not the application. This is why the GetWindowTask() and the TaskFindHandle() APIs are used.

In block 28, the file is compared with the file name following the switch to command. In the case of a spoken command, such as "switch to WORD", the executed file (WINWORD.EXE) would be compared to the executable file (WINWORD.EXE) associated with text "WORD" spoken after the text "switch to." In the case of an imbedded macro, the executable file WINWORD.EXE would be compared with the text WINWORD.EXE following the text "switch to" appearing in the body of the macro. If the file name is the same as the text following the switch to command, the focus of the operating system would switch to the second application. If the file name is different than the switch to command, then the window in the window list which served as the basis of the comparison, is not the desired application (i.e. the second application) and the windows list is checked for any additional windows as shown in block 30. If there are additional windows, processing continues back to block 22 and the process is repeated. If there are no additional windows in the windows list, then the second application is not presently running and the second application would be launched.

There is shown in FIG. 3 a flow diagram of example method of block 14 from FIG. 1 for determining whether the second application is running. The flow diagram of block 14 shown in FIG. 3 shows the steps in detecting whether or not a window appearing in the window list is invisible.

After the determination in block 12 of FIG. 1 that a switch to command has been issued, processing proceeds to block 32 of FIG. 3 where the first window in the window list is read. In block 34, it is determined whether the window read in block 32 is invisible An appropriate API or series of APIs is used to make this determination. In a preferred embodiment, the API that checks whether a window is invisible is the IsWindowvisible() API (from the User.DLL Dynamic Link Library). If the window is not invisible, processing moves to block 16 shown in FIG. 1 and the focus is switched to the application/window read in block 32. If the window is invisible, then processing continues to decision block 36 where it is determined whether or not there are additional windows listed in the windows list. If not, processing moves to block 18 of FIG. 1 and the application is launched. If there are additional windows, processing moves to block 38 where the next window is read and the process repeats itself by moving back to block 34.

The check for whether a window is visible is made because some applications use hidden windows (for example, applications written in Microsoft Visual Basic Version 2.0 of the Microsoft Corporation). If the focus is switched to an invisible window, it would appear on computer screen 64 as if no window had focus. This will effectively freeze the operation of computer 62 for keyboard users, although mouse users would be able to click on a window to establish a focus for that window and maintain control.

There is shown in FIG. 4 a flow diagram of an example method of block 14 from FIG. 1, determining if a window is owned by another application. After it is determined in block 12 that a switch to command has been issued, the first window in the windows list is read in block 40. In block 42 it is determined whether or not the window read in block 40 is owned by another application. Determining if a window is owned is accomplished in a preferred embodiment using the GetWindow () API (from User.DLL) with the window handle being checked for ownership and "GW_OWNER" parameters to determine if the window is owned. If no owner, a "no" is returned. If the window is owned, the windows instance handle is returned. If it is not owned by another application, processing moves to block 16 of FIG. 1 and focus is switched to the second application. If a window is owned by another application, processing moves to block 44 where it is determined whether there are additional windows listed in the windows list. If there are no additional windows, processing moves to block 18 of FIG. 1 and the second application is launched. If there are additional windows, the next window is read in block 46 and processing moves back to block 42 to determine whether or not the next window is owned.

The check is made for whether a window is owned because it is possible that window handles of owned windows are encountered in a windows list before the window that owns them. If focus is switched to the owned windows instead of the window which owned (the proper window) there could be a situation of no focus and a similar problem to that of focusing on an invisible window discussed above. An example of this problem involves the title window that appears under an iconized application. The title window is owned by an application and is typically listed first in the current window list. The title window is not the second application that is desired for focus using a switch to command, but, rather the application with which the title is associated.

There is shown in FIG. 5 a flow diagram of an example method of block 14, shown in FIG. 1, for comparing the file name of a window in a windows list to that of the desired second application associated with the switch to command.

After it is determined that a switch to command has been issued in block 12, processing continues to block 48 where the task entry is read to determine the instance handle in block 50. The file name is then compared in block 52 to the command associated with the switch to command. If they are the same, processing continues to block 16 of FIG. 1 and the focus is switched to the second application. If the file name is different than the file name/macro name issued with the switch to command, processing continues to block 54 where a determination is made as to whether there are additional windows in the windows list. If there are additional windows, processing continues back to block 48 and the process is repeated. If there are no additional windows processing continues to block 18 of FIG. 1 and the second application is launched.

Although illustrated and described herein with reference to certain specific embodiments, the present invention is, nevertheless, not intended to be limited to the details shown. Rather, various modifications may be made in the details within the scope and range of equivalents of the claims and without departing from the spirit of the invention.

What is claimed is:

1. A computer implemented method for using a switch to command to switch a focus of an operating system of the computer form a first application currently in focus to a second application currently not in focus, said first and second applications each having at least one associated window and said operating system maintaining a list of all windows associated with said first and second applications, comprising the steps of:

a) determining that a single switch to voice command for said second application has been detected by said computer;

b) determining if said second application is running;

c) switching the focus of the operating system to said second application if said second application is determined to be running in step (b); and d) launching said second application if said second application is determined not to be running, wherein steps b), c), and d) are performed in response to the single switch to voice command.

2. The method of claim 1 wherein step (b) comprises the further steps of:

i) sequentially reading said list of windows comprising visible and invisible windows until a first visible window is read; and ii) designating said first visible window as said second application.

3. The method of claim 1 wherein step (b) comprises the further steps of:

i) reading a first window in said list of windows, said list of windows comprising invisible and visible windows;

ii) determining whether said first window is an invisible window;

iii) if visible, designating said first window as said second application; and iv) if invisible:
  a) determining if there is an additional window in said list of windows,
  b) if an additional window is present in said list of windows, reading said additional window in said list of windows,
  c) determining whether said additional window is an invisible window,
  e) if visible, designating said additional window as said second application, and
  f) if invisible, repeating step (d) until it is determined that there are no additional windows.

4. The method of claim 1 wherein step (b) comprises the further steps of:

i) sequentially reading said list of windows comprising owned and unowned windows until a unowned window is read; and ii) designating said first unowned window as said second application.

5. The method of claim 1 wherein step (b) comprises the further steps of:

i) reading a first window in said list of windows, said list of windows comprising owned and unowned windows;

ii) determining whether said first window is owned by another window;

iii) if unowned, designating said first window as said second application; and iv) if owned:
  a) determining if there is an additional window in said list of windows,
  b) if an additional window, reading said additional window in said list of windows,
  c) determining whether said additional window is owned by another window,
  d) if unowned, designating said additional window as said second application,
  e) if owned, repeating step (iv) until it is determined that there are no additional windows.

6. The method of claim 1 wherein step (b) comprises the further steps of:

i) reading a task entry associated with a window in said list of windows;

ii) determining an instance handle from said task entry, said instance handle having an associated file name;

iii) reading said file name;

iv) comparing said file name to said second application;

v) determining if said file name is identical to said second application; and vi) switching the focus of the operating system to said second application if said file name is identical to said second application.

7. The method of claim 1 wherein step (b) comprises the further step of determining whether said second application is an executable computer application or a macro.

8. The method of claim 7 wherein step (d) of claim 1 comprises running said macro if it is determined that said second application is a macro.

9. A computer based system for switching a focus of an operating system of the computer using a switch to command from a first application currently in focus to a second application currently not in focus, said first and second applications each having at least one associated window and said operating system maintaining a list of all windows associated with said first and second applications, comprising:

a) means for determining if a single voice command to switch to said second application has been detected by said computer;

b) means for determining if said second application is running;

c) means for switching the focus of the operating system to said second application if said second application is determined to be running by said means for determining if said second application is running; and d) means for launching said second application based on the single voice command if said second application is determined not to be running.

10. The system recited in claim 9 wherein said means for determining if said second application is running further comprises:

i) means for sequentially reading said list of windows comprising visible and invisible windows until a first visible window is read; and ii) means for designating said first visible window as said second application.

11. The system recited in claim 9 wherein said means for determining if said second application is running further comprises:

i) means for reading a first window in said list of windows, said list of windows comprising invisible and visible windows;

ii) means for determining whether said first window is an invisible window;

iii) means for designating said first window as said second application if said first window is visible; and iv) means for determining if there is an additional window in said list of windows if said first window is invisible, including,
  a) means for reading said additional window if said additional window is present,
  b) means for determining whether said additional window is an invisible window if said additional window is present, c) means for designating said additional window as said second application if said additional window is visible, and d) means for determining if there is an additional window in said list of windows if said additional window is invisible.

12. The system recited in claim 9 wherein said means for determining if said second application is running further comprises:

i) means for sequentially reading said list of windows comprising owned and unowned windows until a first unowned window is read; and ii) means for designating said first unowned window as said second application.

13. The system recited in claim 9 wherein said means for determining if said second application is running further comprises:

i) means for reading a first window in said list of windows, said list of windows comprising owned and unowned windows;

ii) means for determining whether said first window is an owned window;

iii) means for designating said first window as said second application if said first window is unowned; and iv) means for determining if there is an additional window in said list of windows if said first window is owned, including, a) means for reading said additional window if said additional window is present, b) means for determining whether said additional window is an owned window if said additional window is present, c) means for designating said additional window as said second application if said additional window is unowned, and d) means for determining if there is an additional window in said list of windows if said additional window is owned.

14. The system recited in claim 9 wherein said means for determining if said second application is running further comprises:

i) means for reading a task entry associated with a window in said list of windows;

ii) means for determining an instance handle from said task entry, said instance handle having an associated file name;

iii) means for reading said file name;

iv) means for comparing said file name to said second application;

v) means for determining if said file name is identical to said second application; and vi) means for switching the focus of the operating system to said second application if said file name is identical to said second application.

15. The system recited in claim 9 wherein said means for determining if said second application is running further comprises means for determining whether said second application is an executable computer application or a macro.

16. The system recited in claim 15 wherein said means for launching said second application further comprises means for running said macro if it is determined that said second application is a macro.

17. A computer readable medium having stored thereon computer executable instructions which, when executed by the computer, cause the computer to perform a method of switching operating system focus from a fist application, currently in focus to a second application, not currently in focus, the method comprising:

detecting a single voice command to switch focus; and
based on the single voice command:
  determining whether the second application is running;
  if the second application is running, switching the focus to the second application; and
  if the second application is not running, launching the second application and switching the focus to the second application.

\* \* \* \* \*

UNITED STATES PATENT AND TRADEMARK OFFICE
CERTIFICATE OF CORRECTION

PATENT NO. : 6,212,541 B1  
DATED : April 3, 2001  
INVENTOR(S) : Garrett McAuliffe et al.

Page 1 of 1

It is certified that error appears in the above-identified patent and that said Letters Patent is hereby corrected as shown below:

<u>Column 8, claim 1,</u>  
Line 62, "form" should be -- from --.

Signed and Sealed this

Sixteenth Day of April, 2002

Attest:

JAMES E. ROGAN  
Attesting Officer    *Director of the United States Patent and Trademark Office*